United States Patent
Pawar et al.

(10) Patent No.: US 10,075,985 B2
(45) Date of Patent: Sep. 11, 2018

(54) UPLINK SYNCHRONIZATION WITH ASSISTED MMWAVE ENHANCED NODE B

(71) Applicant: INTEL IP CORPORATION, Santa Clara, CA (US)

(72) Inventors: Sameer Pawar, Santa Clara, CA (US); Huaning Niu, Milpitas, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 152 days.

(21) Appl. No.: 14/827,678

(22) Filed: Aug. 17, 2015

(65) Prior Publication Data
US 2017/0055298 A1 Feb. 23, 2017

(51) Int. Cl.
| | |
|---|---|
| *H04L 5/14* | (2006.01) |
| *H04W 74/08* | (2009.01) |
| *H04W 56/00* | (2009.01) |
| *H04L 27/26* | (2006.01) |
| *H04W 74/00* | (2009.01) |

(52) U.S. Cl.
CPC ....... *H04W 74/0891* (2013.01); *H04L 5/1469* (2013.01); *H04L 27/2626* (2013.01); *H04W 56/004* (2013.01); *H04W 56/0005* (2013.01); *H04W 74/006* (2013.01)

(58) Field of Classification Search
CPC .... H04B 7/024; H04B 7/0408; H04B 7/0617; H04W 56/001; H04W 56/0005; H04W 56/004; H04W 72/0413; H04W 56/00; H04W 56/0045; H04W 72/12; H04W 88/08; H04W 74/0891; H04W 76/046; H04L 27/2626
See application file for complete search history.

(56) References Cited

U.S. PATENT DOCUMENTS

| | | | |
|---|---|---|---|
| 2010/0255847 A1* | 10/2010 | Lee | H04W 52/50 455/436 |
| 2014/0003369 A1 | 1/2014 | Josiam et al. | |
| 2015/0373743 A1* | 12/2015 | Kim | H04L 5/0048 370/329 |
| 2016/0087744 A1* | 3/2016 | El Ayach | H04J 11/0086 370/328 |

FOREIGN PATENT DOCUMENTS

| | | |
|---|---|---|
| EP | 2 887 561 A1 | 6/2015 |
| WO | WO 2013/086164 A1 | 6/2013 |
| WO | WO 2013/183933 A1 | 12/2013 |
| WO | WO 2015/089303 A1 | 6/2015 |

\* cited by examiner

*Primary Examiner* — David Oveissi
(74) *Attorney, Agent, or Firm* — Thorpe North & Western

(57) ABSTRACT

Technology to achieve uplink synchronization with a mmWave enhanced Node B (eNB) is disclosed. In an example, a user equipment (UE) can include circuitry configured to: receive selected random access (RA) parameters from an anchor eNB for uplink synchronization; identify a transmission direction for communication with the mmWave eNB based on a downlink synchronization of the UE with the mmWave eNB; and communicate a random access channel (RACH) transmission in the identified transmission direction for uplink synchronization of time, frequency, and beam direction with the mmWave eNB.

20 Claims, 10 Drawing Sheets

UPLINK SYNCHRONIZATION WITH ASSISTED MMWAVE ENHANCED NODE B

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node in an Evolved Universal Terrestrial Radio Access Network (E-UTRAN) system is referred to as an eNode B (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

The number of users of wireless devices has increased dramatically in recent years. In addition, the amount of data transmitted by each user has substantially increased. However, the bandwidth available for wireless transmission has not increased substantially. One way to accommodate the ever increasing amount of data that is wirelessly communicated is to increase the density of the nodes.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
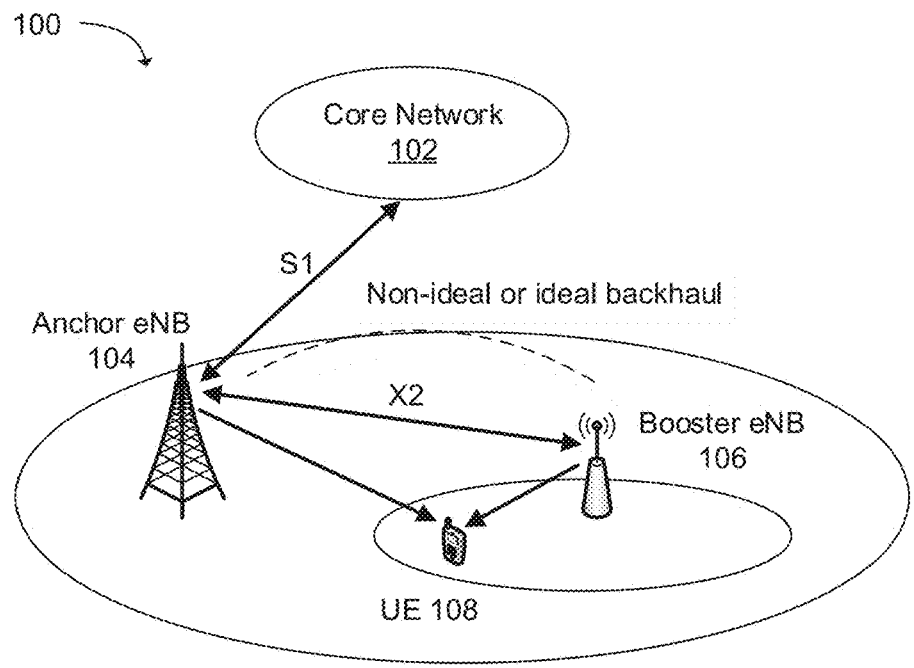
FIG. 1A illustrates a device to device (D2D) discovery zone within an LTE operation zone in accordance with an example.

Reference will now be made to one or more illustrated one or more examples, aspects, and/or embodiments, and specific language will be used herein to describe the same. It will nevertheless be understood that no limitation of the scope of the disclosure is thereby intended.

DETAILED DESCRIPTION

Before the present technology is disclosed and described, it is to be understood that this disclosure is not limited to the particular structures, process operations, actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A wireless infrastructure with a higher density of nodes can enable frequency reuse by minimizing the distance that a signal using a particular frequency needs to travel. Wireless networks have been designed to use heterogeneous networks in which relatively high power nodes (e.g. a macro node) and relatively low power nodes are used either in combination or separately to maximize a number of wireless users in a geographic area.

In addition, small power nodes can take advantage of higher frequency carriers that can provide greater bandwidth. The high frequency signals, such as millimeter wave signals, typically don't travel as far as lower frequency signals. However, this characteristic can be used as a feature for low power nodes in a heterogeneous network. Low power millimeter wave nodes can transmit signals that may only be detectable for a few hundred feet. This allows the same frequencies to be reused over relatively small geographic regions.

In order to maximize signal strength, communication from a UE to a millimeter wave node using millimeter wave carrier signals (i.e. signals from approximately 20 GHz to 300 GHz), the signal can be communicated in a directional manner. However, standard communication procedures for some types of RATs, such as 3GPP, are typically omnidirectional. In addition, the mm Wave nodes operate using a different radio access technology (RAT) than standard cellular nodes. New connection procedures are needed to enable a UE to connect and communicate with a millimeter wave node.

A technology is described for achieving uplink synchronization with a mmWave enhanced Node B (eNB) (e.g., a mmWave eNB). In a heterogeneous network, a higher power macro node (e.g., a macro eNB or an anchor eNB) can be used to communicate control information. In one aspect, a user equipment (UE) can receive selected random access (RA) parameters from an anchor eNB for uplink synchronization. The UE can identify a transmission direction for communication with the mmWave eNB based on a downlink synchronization of the UE with the mmWave eNB. The UE can communicate a random access channel (RACH) transmission in the identified transmission direction for uplink synchronization of time, frequency, and beam direction with the mmWave eNB.

In one embodiment, multiple design and configuration options are provided for an uplink (UL) random access (RACH) signal design for a time-division-duplex (TDD) mmWave eNB (e.g., a mmWave small cell eNB) in an anchor-booster system. The RACH signal can be used to achieve simultaneous uplink time/frequency synchronization as well as identify the UL beam direction. The LTE eNB (macro or small-cell) can be used as an anchor radio-access-technology (RAT) for coverage and delay sensitive applications, while the mmWave eNB can be used as data boosters for non-delay sensitive applications. The mm wave eNBs can then be used to provide broadband coverage to UEs within their vicinity, allowing the UEs to upload and download non-delay sensitive applications at high speeds.

In one aspect, a UE can first connect with an anchor eNB using standard procedures. The UE can use the anchor RAT node to achieve a contention-free random access UL RACH communication with the booster mmWave RAT node, along with reduced overhead/latency. Additionally, in a time-division duplex (TDD) mmWave eNB system, the UE can utilize a downlink beam direction acquired using a primary synchronization signal and a secondary synchronization signal (PSS and SSS), for a directional uplink RACH transmission. The UL RACH transmission can be repeated multiple times over a period of time to enable directional reception by communicating over multiple beam directions. As a benefit, the directional transmission and reception in the UL can provide much needed beam-forming gain in the power limited UL transmission from the UE to the mmWave eNB. Thus, the present technology can simultaneously detect the UL beam direction, as well as the UL timing/frequency synchronization for a mmWave eNB. The RACH sequence length can also be designed to be a multiple of mmWave orthogonal frequency-division multiplexing (OFDM) symbol duration to enable a flexible number of RACH repeats in time.

Figure 1B:
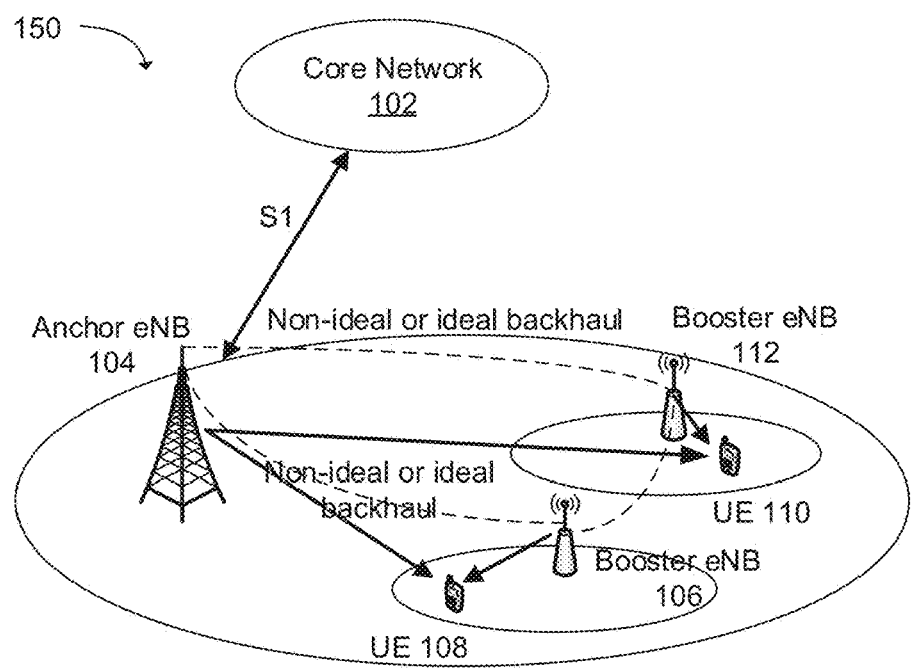
FIG. 1B illustrates a device to device (D2D) discovery zone within an LTE operation zone having at least two user equipment (UE) in accordance with an example.

FIGS. 1A-1B illustrates an exemplary anchor-booster network architecture 100 and 150. The anchor-booster network architecture 100 and 150 are a form of a heterogeneous network. The anchor-booster network architecture 100 can include at least one anchor evolved node B (eNB) 104 and at least one booster eNB 106, such as a mmWave small eNB or another type of low power (i.e. small) eNB. The anchor eNB 104 can be associated with an anchor cell, macro cell or primary cell. The booster eNB 106 can be associated with a booster cell, small cell or secondary cell. The booster eNB 106 can operate in the same or different frequency bands as the anchor eNB 104.

The anchor eNB 104 can be a high transmission power eNB for coverage and connectivity over a relatively large geographic area. The anchor eNB 104 can be responsible for mobility of the UE because the coverage of the anchor eNB 104 is generally wider than that of the booster eNB 106. The anchor eNB 104 can also be responsible for communicating control information with the UE. In one embodiment, control information can be communicated using radio resource control (RRC) signaling.

The booster eNB 106 can be a low transmission power eNB for traffic offloading (i.e., offloading data transmissions) and quality of service (QoS) enhancement. The anchor eNB 104 and the booster eNB 106 can both serve packet data depending on the required QoS. For example, the anchor eNB 104 can serve delay sensitive data, such as Voice over IP (VoIP), while the booster eNB 106 can serve delay tolerant data, such as data communicated using file transfer protocol (FTP) or other types of delay tolerant data.

A user equipment (UE) 108 can be supported by both the booster eNB 106 and the anchor eNB 104 in order to ensure mobility robustness, satisfy QoS performance and balance the traffic load between the anchor eNB 104 and the booster eNB 106. In other words, the UE 108 can support dual connectivity because the UE can be served by both the booster eNB 106 and the anchor eNB 104. With such dual connectivity, the anchor eNB 104 can handle control plane signaling and delay-sensitive traffic, while the booster eNB 106 can handle delay-tolerant data-plane traffic.

As shown in FIG. 1A, the booster eNB 106 can be deployed under the coverage of the anchor eNB 104 and connected to the core network 102 via the anchor eNB 104. The anchor eNB 104 and the booster eNB 106 can be connected via an X2 interface or another type of interface. The anchor eNB 104 and the core network 102 can be connected via an S1 interface. The backhaul link connecting the anchor eNB 104 and the booster eNB 106 can be ideal or non-ideal, wherein an "ideal" backhaul link has a latency (in milliseconds) that is less than a predetermined value and a "non-ideal" backhaul link has a latency that is greater than the predetermined value. The predetermined value can be selected by a network operator based on the network architecture, geographic operating region, cell density, etc.

Each backhaul technology can be associated with a latency (one-way), throughput and priority level. For example, fiber access 1 can have a latency of 10-30 millisecond (ms), fiber access 2 can have a latency of 5-10 ms, fiber access 3 can have a latency of 2-5 ms, digital subscriber line (DSL) access can have a latency of 10-60 ms, and wireless backhaul can have a latency of 5-35 ms. In one configuration, the latencies associated with fiber access 1, fiber access 2, fiber access 3, DSL access and wireless backhaul may be greater than the predetermined value, and therefore, are considered to be non-ideal backhauls. As another example, fiber can have a latency (one-way) that does not exceed 2.5 microseconds (μs). In one configuration, the latency associated with fiber may be less than the predetermined value, and therefore, can be considered to be an ideal backhaul.

The macro/anchor cell can function as an "umbrella" cell and the small/booster cells can be added to the UE as secondary cells. As described in further detail below, the small/booster cell can be added or removed to the UE via signaling between the UE, booster eNB and anchor eNB. Upon addition of the small/booster cell being coordinated between the anchor eNB and the booster eNB, an radio resource control (RRC) message (i.e., a control plane message) can be communicated to the UE to add the small/booster cell.

Similar to FIG. 1A, as depicted in FIG. 1B, the anchor-booster network architecture 150 can include at least one anchor evolved node B (eNB) 104 and at least booster eNB 106 and booster eNB 112, such as a mmWave small eNB or another type of low power (i.e. small) eNB. The anchor eNB 104 can be associated with an anchor cell, macro cell or primary cell. The booster eNB 106 and booster eNB 112 can be associated with a booster cell, small cell or secondary cell. The booster eNB 106 and booster eNB 112 can operate in the same or different frequency bands as the anchor eNB 104. The booster eNB 106 can be deployed under the coverage of the anchor eNB 104 and connected to the core network 102 via the anchor eNB 104. The anchor eNB 104 and the booster eNB 106 can be connected via an X2 interface or another type of interface. The anchor eNB 104 and the core network 102 can be connected via an S1 interface.

The backhaul link connecting the anchor eNB 104 to both the booster eNB 106 and booster eNB 112 can be ideal or non-ideal, wherein an "ideal" backhaul link has a latency (in milliseconds) that is less than a predetermined value and a "non-ideal" backhaul link has a latency that is greater than the predetermined value. The predetermined value can be selected by a network operator based on the network architecture, geographic operating region, cell density, etc.

Figure 2:
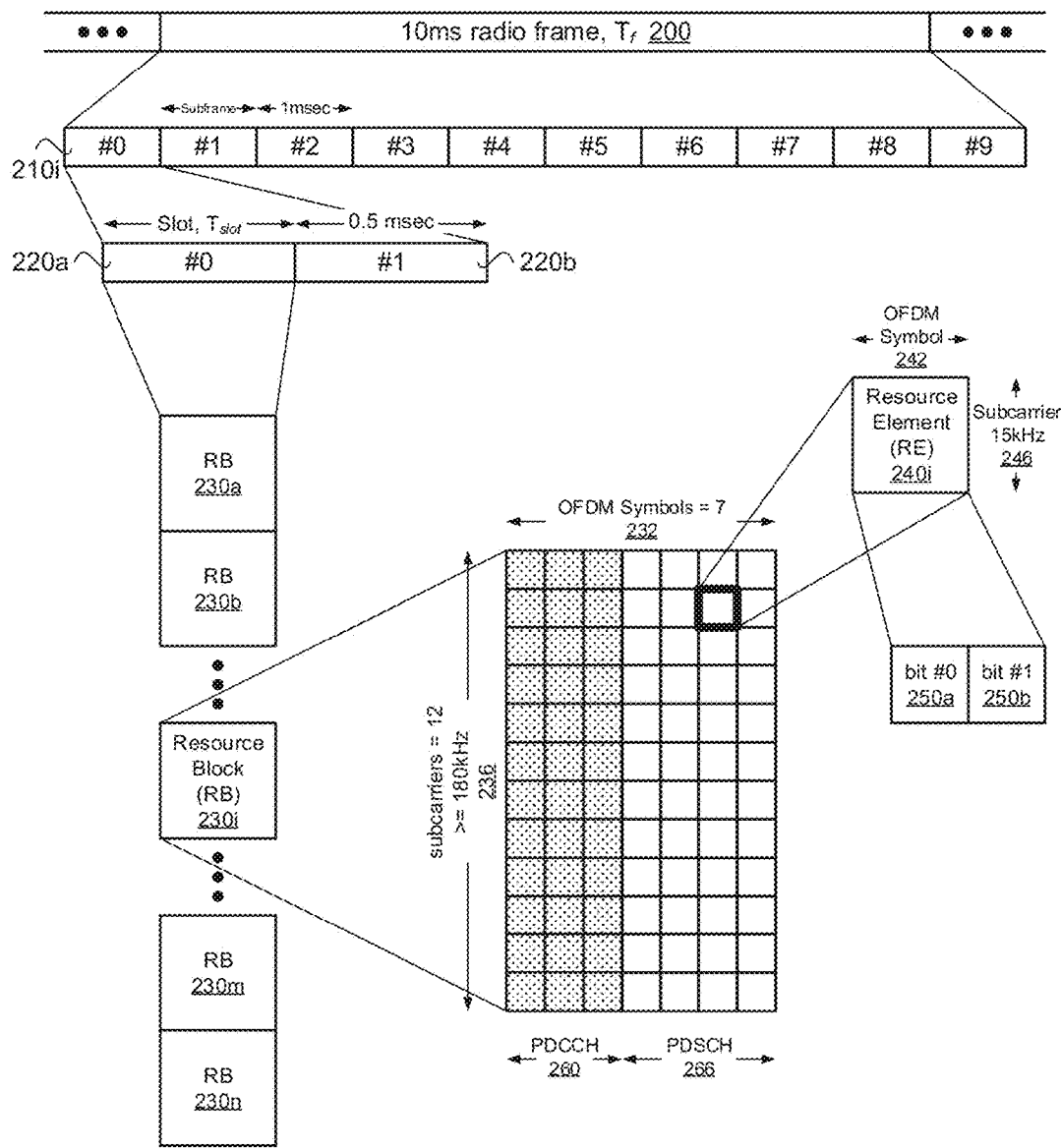
FIG. 2 illustrates a diagram of radio frame resources (e.g., a resource grid) for a downlink (DL) transmission including a legacy physical downlink control channel (PDCCH) in accordance with an example.

FIG. 2 illustrates a diagram of radio frame resources (e.g., a resource grid) for a downlink (DL) transmission including a legacy physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210*i* that are each 2 ms long. Each subframe can be further subdivided into two slots 220*a* and 220*b*, each with a duration, Tslot, of 0.5 ms. The first slot (#0) 220*a* can include a legacy physical downlink control channel (PDCCH) 260 and/or a physical downlink shared channel (PDSCH) 266, and the second slot (#1) 220*b* can include data transmitted using the PDSCH.

Each slot for a component carrier (CC) used by the node and the wireless device can include multiple resource blocks (RBs) 230*a*, 230*b*, 230*i*, 230*m*, and 230*n* based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

In one example embodiment, each RB (physical RB or PRB) 230*i* can include 12-15 kHz subcarriers 236 (on the frequency axis) and 6 or 7 orthogonal frequency-division multiplexing (OFDM) symbols 232 (on the time axis) per slot.

The RB can use seven OFDM symbols if a short or normal cyclic prefix is employed. The RB can use six OFDM symbols if an extended cyclic prefix is used. The resource block can be mapped to 84 resource elements (REs) 240*i* using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250*a* and 250*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

The examples provided in FIG. 2 are not intended to be limiting. Other types of OFDM signaling and control information communication can be achieved using an anchor/booster communication scheme. When the booster eNB is a different type of RAT than the RAT used by the anchor eNB, the communication scheme illustrated in the example of FIG. 2 may or may not be used.

Figure 3:
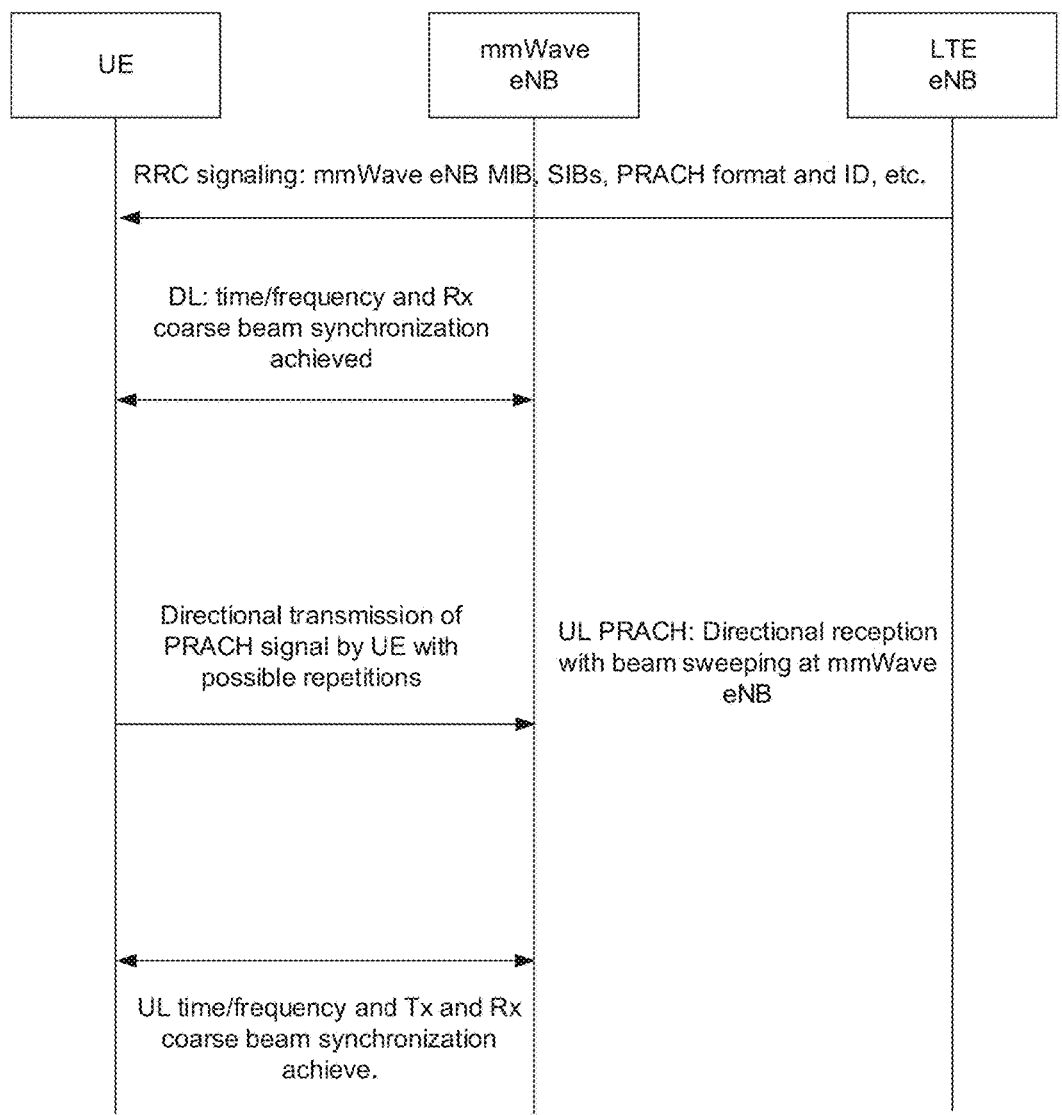
FIG. 3 illustrates achieving uplink synchronization between a user equipment (UE) and a mmWave enhanced Node B (eNB) configured for time division duplexing (TDD) in accordance with an example.

FIG. 3 illustrates achieving uplink synchronization between a user equipment (UE) and a mmWave enhanced Node B (eNB) configured for time division duplexing (TDD) in accordance with an example. As shown in FIG. 3, the anchor eNB can provide the UE with relevant parameters that can be used for UL synchronization on the mmWave eNB. In one embodiment, the parameters can be communicated using radio resource control (RRC) signaling. Alternatively, the relevant parameters, or a portion of the relevant parameters that are common to a plurality of UEs, may be broadcast from the anchor eNB to the plurality of UEs.

For example, the parameters that may be received in the RRC messaging or via broadcast messaging, which enables the UE to perform random access channel communication in the UL with the mm wave eNB, can include: access sequence identification (ID), format ID, resource allocation, master information blocks (MIB), system information blocks (SIB) transmit power related parameters, number of repeats and random access response related parameters.

Before the UE attempts random access in UL, the mmWave eNB can establish a downlink (DL) time/frequency and beam synchronization using the primary and secondary synchronization signals (PSS and SSS). Information obtained from the DL synchronization can be used to perform a directional uplink transmission. At this point, prior to the UL time-frequency-beam synchronization task, the DL time, frequency, and coarse beam synchronization can be achieved using the PSS/SSS signaling from mmWave eNB. It should be noted that DL synchronization signal can be received first at the UE. As such, the UE can then transmit the UL random access signal in the direction acquired using the DL synchronization signal (e.g., directional transmission of the RACH signal by the UE with one or more repetitions). The UE can repeat a RACH transmission multiple times. The mmWave eNB may not yet know the receive beam forming direction for the UL signal. The mmWave eNB can be configured to perform receive beam forming in multiple beam directions and achieve UL beam synchronization.

For example, it may be assumed that the DL beam synchronization implies that UE knows a coarse transmission beam direction to receive DL transmissions. Using the channel reciprocity in TDD systems, the UE can also use this known and identified beam direction for one or more UL transmissions. However, the mmWave eNB has no reception beam direction established for efficient reception of an UL RACH signal. Hence, multiple repeats of transmitting the RACH signal by the UE may be performed to enable the mmWave eNB to perform receive beamforming in multiple beam directions to determine an optimum received beam direction to receive the RACH transmission and future UL transmissions.

As such, the UE may repetitively perform the directional transmission of the RACH signal using the identified direction established in the DL. That is, the UE can repeat the RACH transmission multiple times in the identified direction established in the DL time/frequency and beam synchronization, so that the mmWave small-cell can perform receive beam forming in multiple beam directions and achieve UL beam synchronization. The mmWave eNB may perform beam sweeping in one of a plurality of directions, such as in a selected increment within a 360-degree direction. The number and the pattern of the scanned beams depend on the UE and mmWave eNB capability and can be configured using the RRC messaging. For example, if a UE, based on its capability, found 1 out of 16 attempted DL beams, then the UE may repeat the RACH transmission in the UL at least 16 times to enable the mmWave eNB to perform receive beamforming in 16 directions to find the beam direction of the UL RACH signal. As compared to DL time/frequency synchronization, the UL synchronization enjoys beam-forming multi antenna gain since both transmission, as well as reception, are directional. While an example of beamforming in 16 directions has been provided, it is not intended to be limiting. The actual number of directions in which beamforming is divided can depend on the system attributes of the UE and the mmWave eNB. A reduced number of directions can allow faster scanning, but require a higher power signal since the signal may be spread over a larger area. An increased number of directions can reduce the amount of power by allowing a focused transmission beam. However, a longer time will be used to scan and locate an optimal directional transmission between the UE and the eNB.

In order for to achieve uplink synchronization between the UE and the mmWave eNB, the following guidelines using system numerology, such as, for example cell radius, delay-spread, etc. can be used as inputs to determine a RACH synchronization signal design.

Guideline 1: For an unambiguous detection of the UL timing detection, the RACH Sequence length (Tseq) can be equal to and/or greater than the round-trip-time (RTT) plus maximum delay spread. That is, the RACH sequence time length is equal to or greater than a round-trip-time (RTT) of the RACH transmission plus a maximum delay spread of the of the RACH transmission.

Guideline 2: For a multi-carrier system, for front-end signal processing convenience, the RACH signal sub-carrier spacing (e.g., the Sub-carrier spacing compatibility) can be set to be an integer multiple of system sub-carrier spacing.

Guideline 3: For bandwidth requirement and time resolution, signal processing identities can be used to verify that the timing resolution is inversely proportional to the occupied RACH bandwidth.

Guideline 4: The Cyclic-prefix (Tcp) time can be selected to be greater than the RTT plus a maximum delay-spread. That is, the cyclic prefix time length should be greater than a round-trip-time (RTT) of the RACH transmission plus a maximum delay spread of the RACH transmission.

Guideline 5: The total duration of the RACH signal transmission can be selected to be equal to a RACH sequence time length plus a cyclic prefix time length (Total RACH signal duration=Tseq+Tcp).

Guideline 6: The total RACH signal duration can be selected to be an integer multiple of a mmWave OFDM symbol duration, e.g., one or two or three OFDM symbols. That is, the total duration of the RACH transmission can be selected to be an integer multiple of the mmWave eNB orthogonal frequency-division multiplexing (OFDM) symbol duration. The RACH duration being integral multiple of OFDM symbols enables a flexible sector scan, i.e., flexibility in provisioning any number of sector scans without worrying or being concerned about a Fast Fourier Transform (FFT) size. Moreover, for a relatively high carrier frequency, such as a 28 Gigahertz (GHz) carrier frequency of the mmWave eNB, when the subcarrier spacing is reduced and the symbol duration is increased, then half symbol duration length is also possible.

Guideline 7: Multiple formats can be designed based on deployment scenarios (co-located and non-co located mmWave eNB) and LTE assistance.

Guideline 8: Since the physical random access channel (PRACH) is also used for analog beam forming, which can happen much frequently, the shortest PRACH format for beam search may be used in analog beam forming when the UE is already connected to the cell.

Using the above stated guidelines, consider the following example, where there may be multiple RACH signal design options, for a multi-carrier OFDM system, with the following system numerology. In one example, the mmWave eNB can have a Cell radius c selected as 100 meters. The sub-carrier spacing of the mmWave eNB can be selected as 1.5 Megahertz (MHz). The maximum delay-spread can be set at 54 nanoseconds (ns). The OFDM symbol duration without cyclic prefix can be set to 666.7 ns. The maximum RTT equals the cell radius divided by the speed of light, which equals 666.7 ns. In this example, a 139 length Zadoff-Chu (ZC) sequence that is typically used in a 3GPP LTE pre-amble format 4 can be reused for designing a random access signal in the mmWave small-cell. Using the selected variables in this example, the following three design formats for the RACH signal for mmWave small-cell are provided.

Figure 4:
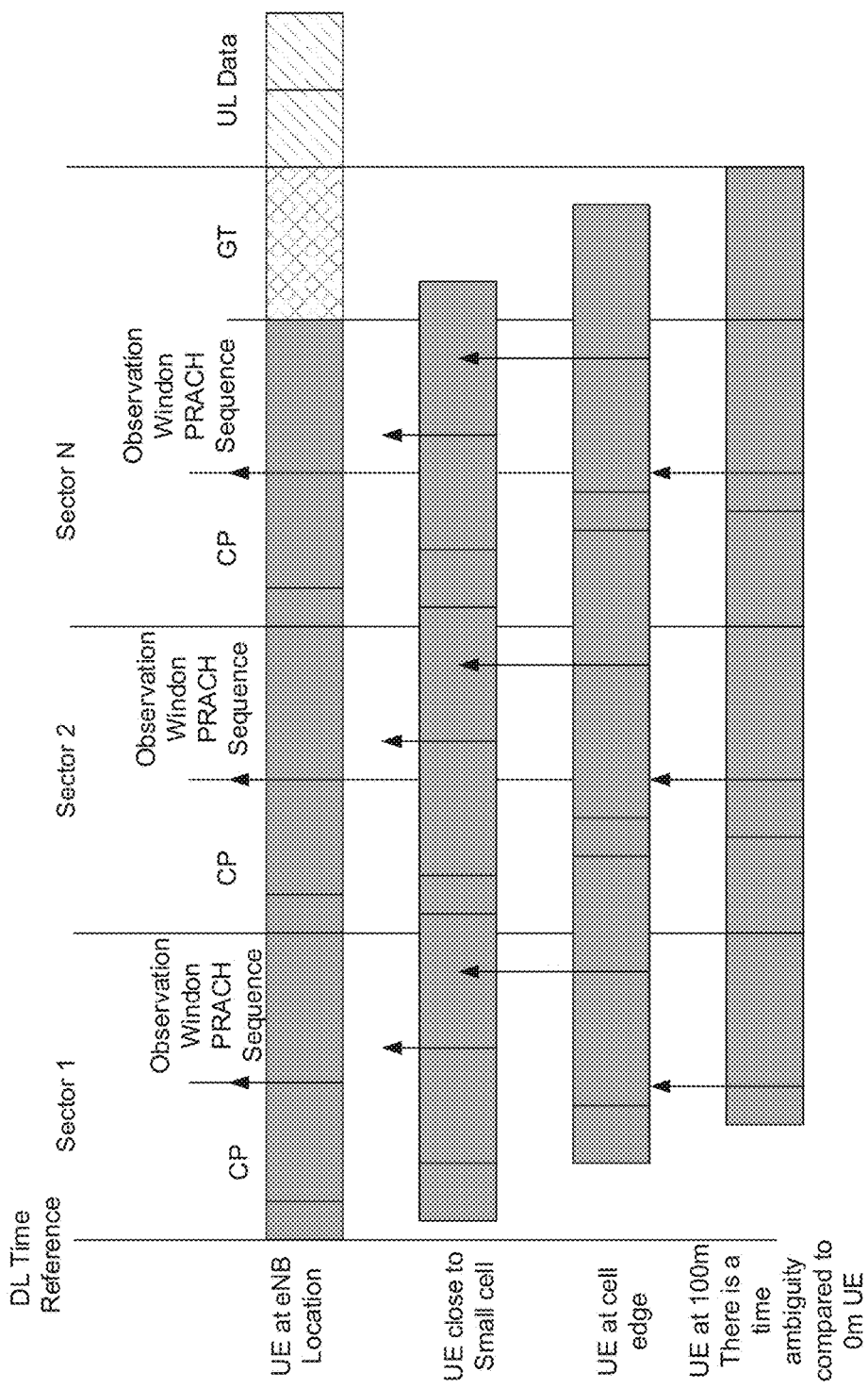
FIG. 4 illustrates a using a first uplink (UL) random access (RACH) signal design for achieving uplink synchronization with a mmWave enhanced Node B (eNB) configured for time division duplexing (TDD) in an anchor-booster system accordance with an example.

Turning to FIG. 4, a first RACH signal design format used for an uplink (UL) random access (RACH) signal is depicted for achieving uplink synchronization with a mmWave enhanced Node B (eNB) configured for time division duplexing (TDD) in an anchor-booster system. That is, FIG. 4 illustrates the UL RACH signal with multiple repeats for the mmWave eNB to perform beam sweeping (e.g., beam scan) in one or more sectors, such as sector 1, sector 2, and up to sector N. The mmWave eNB may perform beam sweeping in one or more directions to provide optimal directional reception of a random access channel (RACH) transmission communicated from the UE for uplink synchronization of time, frequency, and beam direction with the UE. In one aspect, the beam sweeping is performed in one direction at a time. For example, the mmWave eNB may perform the beam sweeping in sector 1. If not successful in achieving uplink synchronization between the UE and the mmWave enhanced Node B (eNB), the mmWave eNB may perform the beam sweeping in sector 2, and if not successful processed to the next sector, such as sector N. N may be set to be 2, 4, 8, 16, 32, 64, 128, or another desired sector split. It should be noted that the beam sweeping is performed in one direction at a time as compared to multiple beams, performing beam sweeping in multiple directions, at the same time due to a single RF chain assumption. In general, if multiple RF chains are available multiple beam directions can be searched per sector depending on the number of RF chains available in the eNB receiver.

As illustrated in FIG. 4, four scenarios are depicted where: 1) the UE is at and/or near the anchor eNB location, 2) the UE is close to the mmWave eNB (e.g., small cell), 3) the UE is at a cell edge (boundary edge), and 4), the UE is at 100 meters (m) from the anchor eNB. The downlink (DL) time is referenced as the starting point in FIG. 4.

In a first example, A RACH signal sub-carrier spacing is equal to the mmWave sub-carrier spacing, i.e., 1.5 MHz. As a result, the RACH sequence length (Tseq), of the RACH signal, is equal to one mmWave OFDM symbol duration. As noted in the above rules, the RACH sequence length (Tseq) is not sufficient for unambiguous detection of UL timing. Specifically, there may be confusion between UEs at a cell-center, i.e., approximately at 0 meters from the anchor eNB and the UEs at the cell-radius, i.e., at a distance of 100 meters from the anchor eNB. Since the mmWave eNB system can be assisted by the anchor eNB, the ambiguity in UE location can be resolved using the location information from anchor cell. This format is more useful in a co-located scenario depicted in FIG. 1 but can also be used in non co-located deployments with some care. The total bandwidth used by the RACH signal in the design of the RACH signal in FIG. 4 is 144 mmWave subcarriers which is equal to 216 MHz, resulting in the time resolution of approximately +/−5 ns. The cyclic-prefix (CP) can be chosen such that the total RACH signal duration is equal to 2 mmWave OFDM symbols with CP.

In one aspect, the upward pointing arrows in each RACH signal indicate a spike where there is maximum correlation value. As noted in FIG. 4, the arrows in the RACH signal of the UE at the center (e.g., at the eNB location) of the cell boundary and the RACH signal of the UE at the cell boundary edge can be aligned. In other words, the alignment between the spikes at the center and the cell edge in FIG. 4 means that without additional side information from an anchor eNB, the mmWave eNB cannot distinguish between two users.

In one aspect, the mmWave eNB receiver can be configured to attempt RACH receiving per beam sector, such as sector 1, sector 2, . . . , sector N for a receiver design with sector scan. For each beam sector, such as sector 1, sector 2, . . . , sector N, a different receive beam may be selected from a codebook. The number of beam sectors may depend on the mmWave eNB and UE capability and can be configured using the RRC messaging. For the RRC Messaging, the number of beam-sectors to be scanned as well as number of RACH transmissions, and the physical RACH (PRACH) format to be used can be configured using RRC messaging of the assisting anchor cell. One guard time (GT) may be used at the end of all the RACH signal repeats, followed by the UL data.

Figure 5:
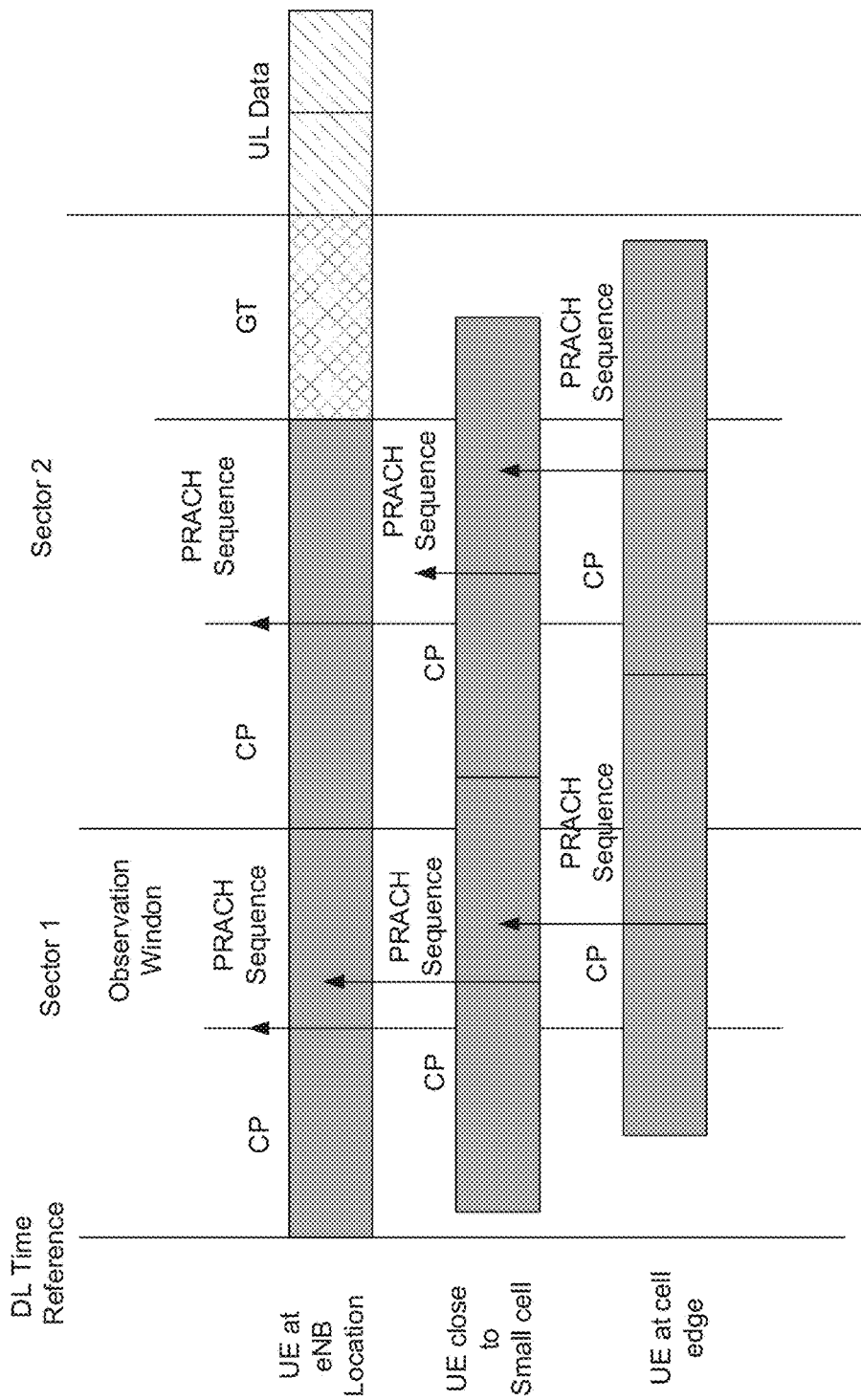
FIG. 5 illustrates using a second uplink (UL) random access (RACH) signal design for achieving uplink synchronization with a mmWave enhanced Node B (eNB) configured for time division duplexing (TDD) in an anchor-booster system accordance with an example.

Turning now to FIG. 5, a second RACH signal design format is used for an uplink (UL) random access (RACH) signal design for achieving uplink synchronization with a mmWave enhanced Node B (eNB) configured for time division duplexing (TDD) in an anchor-booster system. That is, FIG. 5 illustrates a RACH signal with three scenarios depicted where: 1) the UE is at or near the anchor eNB location, 2) the UE is close to the mmWave eNB (small cell), and 3) the UE is at a cell edge. The downlink (DL) time is referenced as the starting point in FIG. 5.

In one aspect, similar to FIG. 4, the UL RACH signal is repeated multiple times for the mmWave eNB to perform beam sweeping (e.g., beam scan) in one or more sectors, such as sector 1 and sector 2. The mmWave eNB may perform beam sweeping in one or more directions within one of the sectors for receiving beamforming in multiple beam directions to provide optimal directional reception of a random access channel (RACH) transmission communicated from the UE in the transmission direction for uplink synchronization of time, frequency, and beam direction with the UE. In FIG. 5, the RACH signal sub-carrier spacing is equal to half of the mmWave sub-carrier spacing, i.e., 0.75 MHz. As a result, the RACH sequence length (Tseq) is equal to two mmWave OFDM symbol durations. As noted in the above guidelines, this RACH sequence length (Tseq) is sufficient for unambiguous detection of UL timing. This second RACH signal design format for the RACH signal can be equally useful in co-located and non co-located scenarios where there are at least two users.

The total bandwidth used by the RACH signal in FIG. 5 is 72 mmWave subcarriers, equal to 108 MHz. This results in a time resolution of approximately −/+10 ns. The cyclic-prefix (CP) can be chosen such that the total RACH duration is equal to 3 mmWave OFDM symbols with CP.

For the RRC Messaging, the number of beam-sectors to be scanned as well as number of RACH transmissions, and the PRACH format to be used can be configured using RRC messaging of the assisting anchor cell. One guard time (GT) may be used at the end of all the RACH signal repeats, followed by the UL data.

In another embodiment, a third RACH signal design format may be considered in which the RACH signal sub-carrier spacing is set to be equal to twice the mmWave sub-carrier spacing, i.e., 3 MHz. As a result, the RACH sequence length (Tseq) is equal to one half of the mmWave OFDM symbol duration. As noted in the design principles, this length is not sufficient for unambiguous detection of UL timing. Again, the location information from the assisting anchor cell can be used to resolve the ambiguity in the UE location. The total bandwidth used by a RACH signal for the third RACH signal design format is 288 mmWave subcarriers, equal to 432 MHz, resulting in a time resolution of approximately +/−2.5 ns. The cyclic-prefix (CP) can be chosen such that the total RACH duration is equal to 1 mmWave OFDM symbol with CP. In one embodiment, the third RACH signal design format can also be used for ongoing beam training when the UE is already connected to the mmWave eNB (small cell).

In one aspect, the first and second RACH signal design format for an uplink (UL) can be used for initial time acquisition in the uplink. The third, additional RACH signal design format is shorter compared to the first and the second RACH signal design format for an uplink (UL) and requires additional help/information to resolve an ambiguity. As such, the third, additional RACH signal design format may be used as an ongoing tracking of the UL timing. The additional help or information can be in the format of approximate timing advance (TA) information. This help is usually received from anchor/assisting eNB or from historical data of a particular UE, e.g., if the UE TA information is tracked over time the eNB has an estimate to begin with from history.

It should be noted that in each of the above mentioned three RACH signal design formats, it is ensured that the total RACH signal length is an integer (or half integer) multiple of mmWave OFDM symbols. This feature provides flexibility in the number of times a RACH signal is repeated for an UL beam scan.

In one aspect, the sub-frame containing the RACH signal consists of multiple repeats of the RACH signal. The number repeats can be scheduled by the RRC messaging in the 3GPP LTE system. One or more repeats can be used to scan a particular beam/sector direction. If more than one repeat of a RACH signal is used for one sector scan, a noise-averaging gain is achieved. Only one guard time (GT) is used at the end of all the RACH signal repeats. The sub-frame structure for the first design feature of the RACH signal is illustrated in FIG. 4. The sub-frame structure for the second design feature of the RACH signal is illustrated in FIG. 5. A similar SF structure can be designed for the third, additional RACH signal design format, with a change of observation window depending on the side information about the UE location from LTE system.

Figure 6:
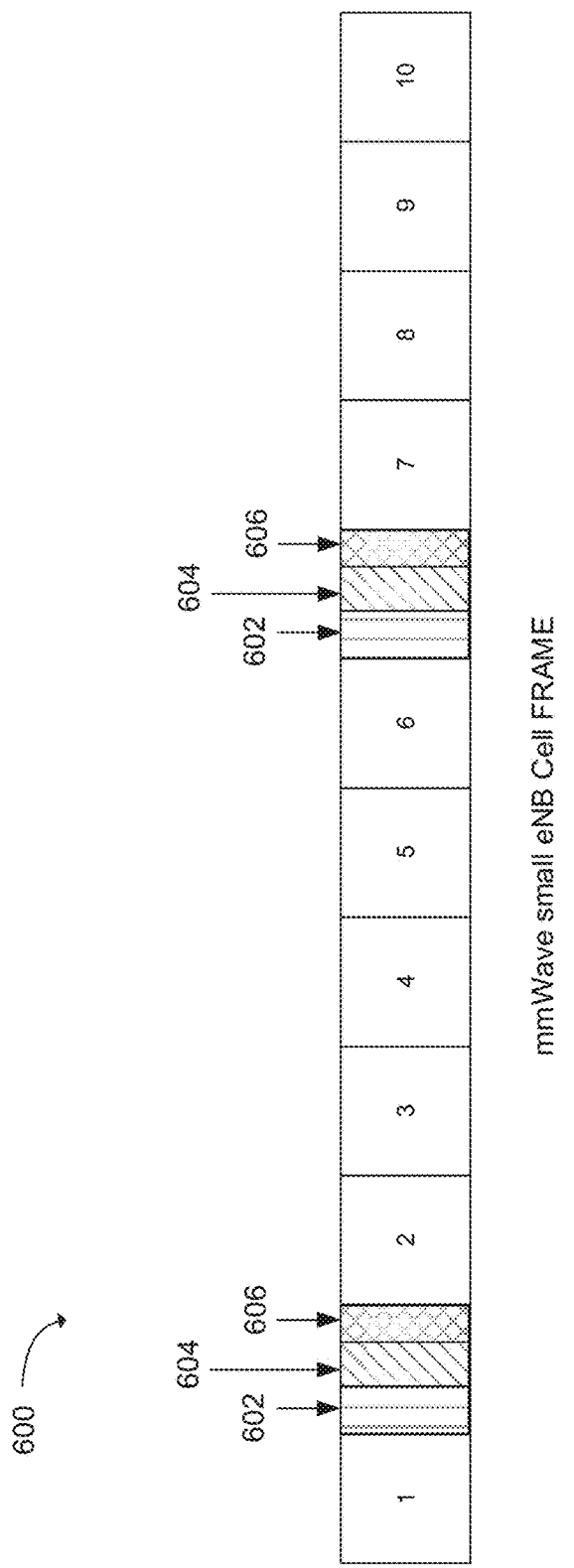
FIG. 6 illustrates a mmWave enhanced Node B (eNB) cell frame exploiting a directional beam duality in a downlink (DL) and uplink (UL) channel in a time division duplexing (TDD) mmWave enhanced Node B (eNB) system in accordance with an example.

Having discussed the RACH signal control and design for uplink synchronization, how the RACH signal control system operates in an overall radio frame, which consists of multiple sub-frames, will now be discussed. FIG. 6 illustrates a time division duplex (TDD) mmWave eNB cell frame 600 exploiting a directional beam duality in a downlink (DL) and uplink (UL) channel in a time division duplexing (TDD) mmWave eNB system. In FIG. 6, the RACH resource 606 for the RACH signal can be immediately allocated following the primary synchronization signals (PSS) 602 and the secondary synchronization signals (SSS) 604. The mmWave eNB transmission cell frame 600 may include 10 subframes listed 1-10.

For example, in operation, there is a mmWave eNB transmission in the subframe 1 followed by a PSS transmission 602 and SSS transmission 604. Following the PSS transmission 602 and the SSS transmission 604, the UE has the synchronized DL time and knowledge of the receive beam direction, as described above. Next, the UE sends one or more directional transmissions of the RACH resource 606 (e.g., the RACH signal) in one direction to enable the mmWave eNB to perform receive beamforming. In other words, the multiple repeats of the RACH signal occur in the RACH resource 606 following the PSS transmission 602 and the SSS transmission 604, which enables the UE to identify a transmission direction for communication with the mmWave eNB based on a downlink synchronization of the UE with the mmWave eNB. This pattern is also observed, by way of example only, following subframe 6 of the mmWave eNB cell frame 600.

Figure 7:
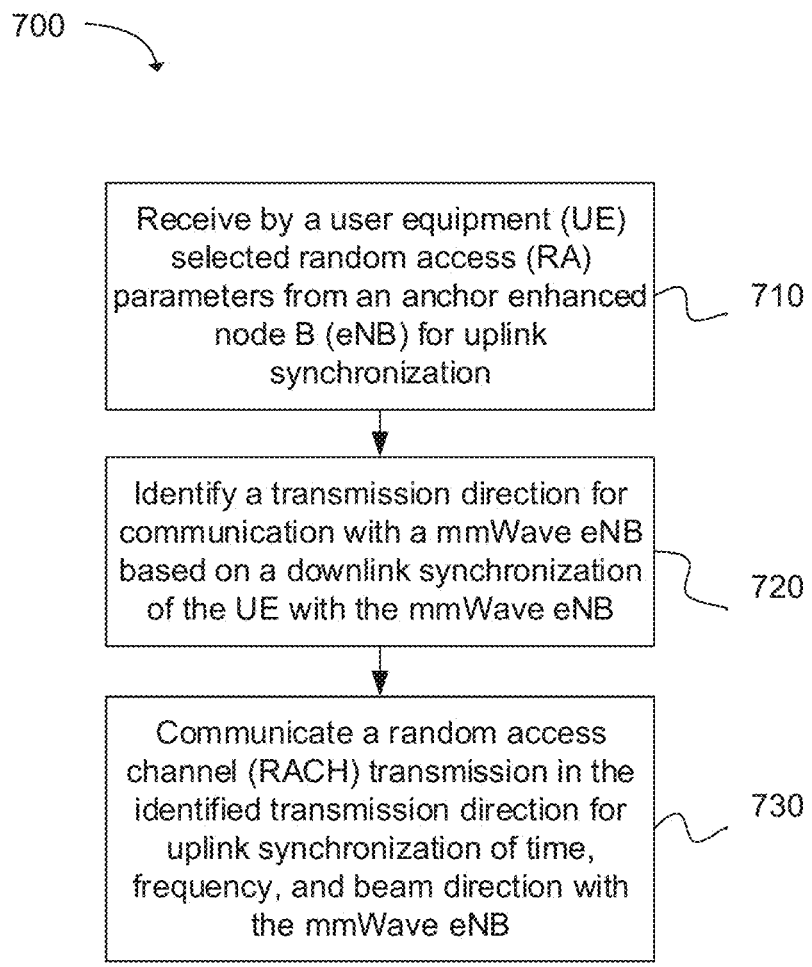
FIG. 7 depicts functionality of a user equipment (UE) operable to perform uplink synchronization with a mmWave enhanced Node B (eNB) in accordance with an example.

FIG. 7 depicts functionality of an apparatus of a user equipment (UE) comprising circuitry configured with one or more processors operable to perform uplink synchronization with a mmWave enhanced Node B (eNB) in accordance with an example.

The functionality can be implemented as a method or the functionality can be executed as instructions on a machine, where the instructions are included on at least one computer readable medium or one non-transitory machine readable storage medium. The one or more processors can be configured to receive, by the UE, selected random access (RA) parameters from an anchor eNB for uplink synchronization, as in block 710. The one or more processors can be configured to identify a transmission direction for communication with the mmWave eNB based on a downlink synchronization of the UE with the mmWave eNB, as in block 720. The one or more processors can be configured to communicate a random access channel (RACH) transmission in the identified transmission direction for the uplink synchronization of time, frequency, and beam direction with the mmWave eNB, as in block 730.

In one aspect, the one or more processors communicate the RACH transmission a plurality of times to enable the mmWave eNB to perform receive beamforming in multiple beam directions to provide optimal directional reception of the RACH transmission. The one or more processors may also receive, via radio resource control (RRC) messaging from the anchor eNB, a schedule for communicating the RACH transmission a selected number of times. The total duration of the RACH transmission may be an integer multiple of an orthogonal frequency-division multiplexing (OFDM) symbol duration of the mmWave eNB. The total duration of the RACH transmission is equal to a RACH sequence time length plus a cyclic prefix time length. The RACH sequence time length is equal to or greater than a round-trip-time (RTT) of the RACH transmission plus a maximum delay spread of the of the RACH transmission. The cyclic prefix time length is greater than a round-trip-time (RTT) of the RACH transmission plus a maximum delay spread of the RACH transmission.

In one aspect, the one or more processors are configured to select a RACH sub-carrier spacing of the RACH transmission that is approximately equal to: 1) a mmWave eNB sub-carrier spacing, wherein a RACH sequence time length is equal to one orthogonal frequency-division multiplexing (OFDM) symbol duration of the mmWave eNB; 2) one half (½) the mmWave eNB sub-carrier spacing, wherein the RACH sequence time length is equal to two OFDM symbol durations of the mmWave eNB; or 3) twice the mmWave eNB sub-carrier spacing, wherein the RACH sequence time length is equal to one-half (½) of an OFDM symbol duration of the mmWave eNB.

In one configuration, a first processor can perform the operations in blocks 710, 720 and 730. The first processor can be a single processor, or alternatively, the first processor can be comprised of one or more separate processors. In one configuration, a second processor can perform the operations in blocks 710, 720 and 730. In addition, a transceiver and baseband processor can be used to perform the operations of receiving and transmitting (i.e. communicating).

Figure 8:
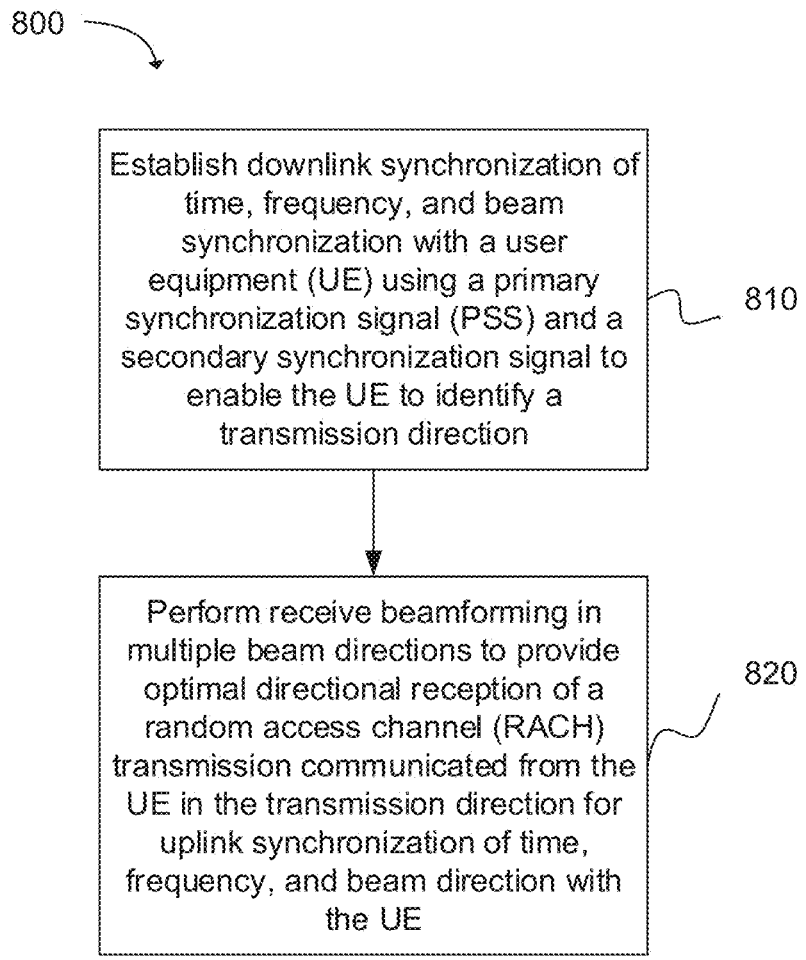
FIG. 8 depicts functionality of depicts functionality of a mmWave enhanced Node B (eNB) operable to perform uplink synchronization with a user equipment (UE) in accordance with an example.

FIG. 8 depicts functionality of depicts functionality 800 of a mmWave enhanced Node B (eNB) configured for time division duplexing (TDD), operable to achieve uplink synchronization with a user equipment (UE), the mmWave eNB having circuitry configured to perform uplink synchronization with a user equipment (UE) in accordance with an example.

The functionality can be implemented as a method or the functionality can be executed as instructions on a machine, where the instructions are included on at least one computer readable medium or one non-transitory machine readable storage medium. The one or more processors can be configured to establish downlink synchronization of time, frequency, and beam synchronization with the UE using a primary synchronization signal and a secondary synchronization signal to enable the UE to identify a transmission direction, as in block 810. The one or more processors can be configured to perform receive beamforming in multiple beam directions to determine a directional reception of a random access channel (RACH) transmission communicated from the UE in the transmission direction for uplink synchronization of time, frequency, and beam direction with the UE, as in block 820.

In one aspect, one or more processors can be configured to perform the receive beamforming in a plurality of sectors. The one or more processors can be configured to use a codebook to select a different receive beam for each one of the plurality of sectors. The total duration of the RACH transmission is an integer multiple of an orthogonal frequency-division multiplexing (OFDM) symbol duration of the mmWave eNB. A total duration of the RACH transmission is equal to a RACH sequence time length plus a cyclic prefix time length. The RACH sequence time length is equal to or greater than a round-trip-time (RTT) of the RACH transmission plus a maximum delay spread of the of the RACH transmission. The cyclic prefix time length is greater than a round-trip-time (RTT) of the RACH transmission plus a maximum delay spread of the RACH transmission. The one or more processors can be configured to is further configured to select a RACH sub-carrier spacing of the RACH transmission equal to: 1) a mmWave eNB sub-carrier spacing, wherein a RACH sequence time length is equal to one orthogonal frequency-division multiplexing (OFDM) symbol duration of the mmWave eNB; 2) one half (½) the mmWave eNB sub-carrier spacing, wherein the RACH sequence time length is equal to two OFDM symbol durations of the mmWave eNB; or 3) twice the mmWave eNB sub-carrier spacing, wherein the RACH sequence time length is equal to one-half (½) of an OFDM symbol duration of the mmWave eNB.

In one configuration, a first processor can perform the operations in blocks 810 and 820. The first processor can be a single processor, or alternatively, the first processor can be comprised of one or more separate processors. In one configuration, a second processor can perform the operations in blocks 810 and/or 820. A transceiver and baseband processor can also be used to perform the operations of receiving and transmitting (i.e. communicating).

Figure 9:
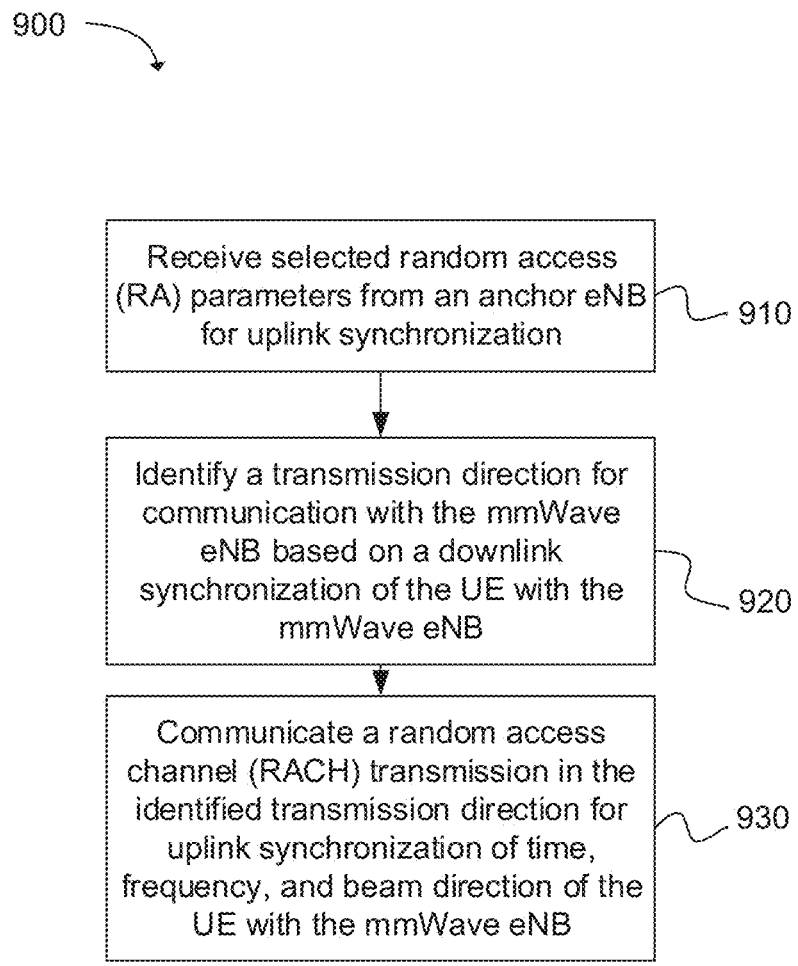
FIG. 9 depicts an additional functionality of a user equipment (UE) operable to perform uplink synchronization with a mmWave enhanced Node B (eNB) in accordance with an additional example.

FIG. 9 depicts functionality 900 of a user equipment (UE) comprising circuitry having one or more processors for achieving uplink synchronization with a mmWave enhanced Node B (eNB) configured for time division duplexing (TDD) in accordance with an example. The functionality 900 may be representative of some or all of the operations executed by one or more aspects as described herein. The functionality 900 can be implemented as a method or the functionality can be executed as instructions on a machine, where the instructions are included on at least one computer readable medium or one non-transitory machine readable storage medium.

The one or more processors can be configured to receive selected random access (RA) parameters from an anchor eNB for uplink synchronization, as in block 910. The one or more processors can be configured to identify a transmission direction for communication with the mmWave eNB based on a downlink synchronization of the UE with the mmWave eNB, as in block 920. The one or more processors can be configured to communicate a random access channel (RACH) transmission in the identified transmission direction for uplink synchronization of time, frequency, and beam direction of the UE with the mmWave eNB, as in block 930.

In one aspect, the one or more processors may cause the UE to communicate the RACH transmission a plurality of times to enable the mmWave eNB to perform receive beamforming in multiple beam directions to provide a directional reception of the RACH transmission. The one or more processors cause the UE to communicate the RACH transmission a plurality of times to enable the mmWave eNB to perform receive beamforming in multiple beam directions in a plurality of sectors to provide directional reception of the RACH transmission, wherein the plurality of sectors are configured using radio resource control (RRC) messaging, and a codebook is used select a different receive beam for each of the plurality of sectors for performing the receiving beamforming. The one or more processors may cause the UE to receive a schedule, via radio resource control (RRC) messaging with an anchor eNB, of the plurality of times for communicating the RACH transmission. The total duration of the RACH transmission may be an integer multiple of an orthogonal frequency-division multiplexing (OFDM) symbol duration of the mmWave eNB. The RACH sequence time length may be equal to or greater than a round-trip-time (RTT) of the RACH transmission plus a maximum delay spread of the of the RACH transmission. The cyclic prefix time length may be greater than a round-trip-time (RTT) added to a maximum delay spread.

In one aspect, the one or more processors are configured to select a RACH sub-carrier spacing of the RACH transmission equal to: 1) a mmWave eNB sub-carrier spacing, wherein a RACH sequence time length is equal to one orthogonal frequency-division multiplexing (OFDM) symbol duration of the mmWave eNB; 2) one half (½) the mmWave eNB sub-carrier spacing, wherein the RACH sequence time length is equal to two OFDM symbol durations of the mmWave eNB; or 3) twice the mmWave eNB sub-carrier spacing, wherein the RACH sequence time length is equal to one-half (½) of an OFDM symbol duration of the mmWave eNB.

In one configuration, a first processor can perform the operations in blocks 910, 920 and 930. The first processor can be a single processor, or alternatively, the first processor can be comprised of one or more separate processors. In one configuration, a second processor can perform the operations in blocks 910, 920 and 930. In addition, a transceiver and baseband processor can be used to perform the operations of receiving and transmitting (i.e. communicating).

Figure 10:
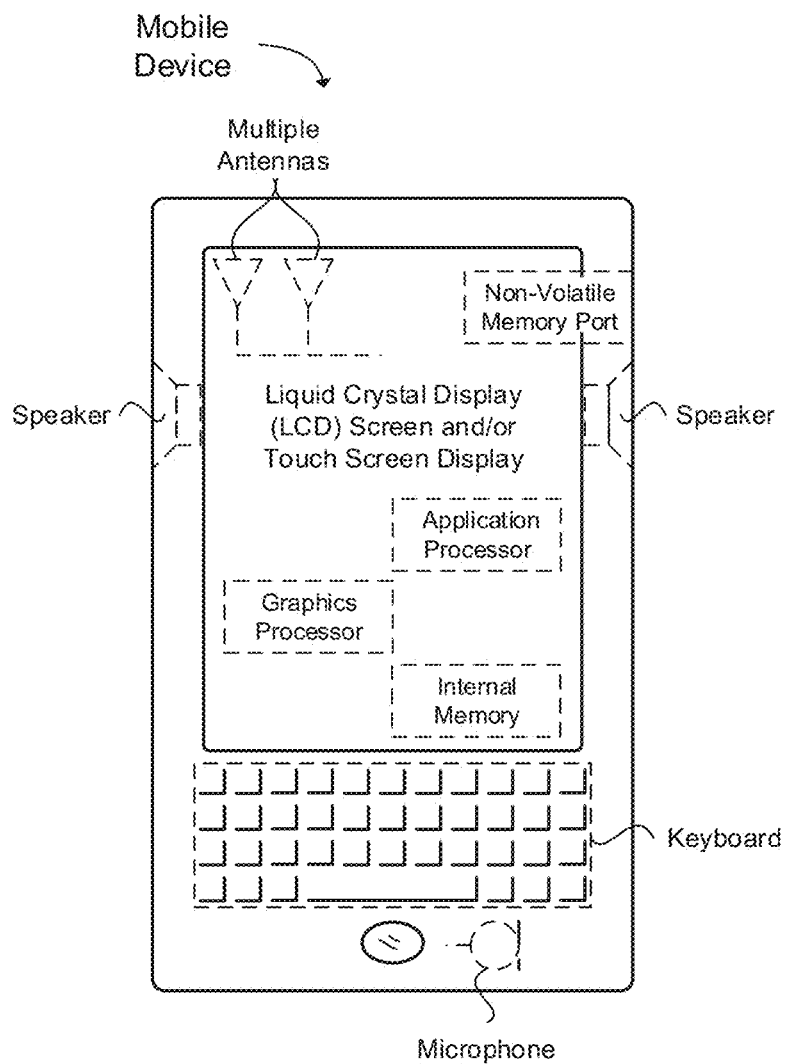
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one aspect of the present disclosure. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various aspects and example of the present disclosure may be referred to herein along with alternatives for the various components thereof. It is understood that such embodiments, examples, and alternatives are not to be construed as defacto equivalents of one another, but are to be considered as separate and autonomous representations of the present disclosure.

Furthermore, the described features, structures, or characteristics may be combined in any suitable manner in one or more examples, aspects, and/or embodiments. In the following description, numerous specific details are provided, such as examples of layouts, distances, network examples, etc., to provide a thorough understanding of one or more examples, aspects, and/or embodiments of the disclosure. One skilled in the relevant art will recognize, however, that the disclosure can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), the apparatus comprising circuitry configured to achieve uplink synchronization with a millimeter wave (mmWave) enhanced Node B (eNB) configured for time division duplexing (TDD), the circuitry comprising:
   memory; and a processor coupled to the memory, configured to:
      receive selected random access (RA) parameters from an anchor eNB for uplink synchronization on the mmWave eNB;
      identify a transmission direction for communication with the mmWave eNB based on a downlink synchronization of the UE with the mmWave eNB;
      communicate a random access channel (RACH) transmission in the identified transmission direction for uplink synchronization of time, frequency, and beam direction with the mmWave eNB; and
      receive, via radio resource control (RRC) messaging from the anchor eNB, a schedule for communicating the RACH transmission a selected number of times, wherein a total duration of the RACH transmission is an integer multiple of an orthogonal frequency-division multiplexing (OFDM) symbol duration of the mmWave eNB.

2. The apparatus of claim 1, wherein the circuitry is further configured to communicate the RACH transmission a plurality of times to enable the mmWave eNB to perform receive beamforming in multiple beam directions to provide optimal directional reception of the RACH transmission.

3. The apparatus of claim 1, wherein a total duration of the RACH transmission is equal to a RACH sequence time length plus a cyclic prefix time length.

4. The apparatus of claim 3, wherein the RACH sequence time length is equal to or greater than a round-trip-time (RTT) of the RACH transmission plus a maximum delay spread of the RACH transmission.

5. The apparatus of claim 3, wherein the cyclic prefix time length is greater than a round-trip-time (RTT) of the RACH transmission plus a maximum delay spread of the RACH transmission.

6. The apparatus of claim 1, wherein the circuitry is further configured to select a RACH sub-carrier spacing of the RACH transmission that is approximately equal to:
   a mmWave eNB sub-carrier spacing, wherein a RACH sequence time length is equal to one orthogonal frequency-division multiplexing (OFDM) symbol duration of the mmWave eNB;
   one half (½) the mmWave eNB sub-carrier spacing, wherein the RACH sequence time length is equal to two OFDM symbol durations of the mmWave eNB; or
   twice the mmWave eNB sub-carrier spacing, wherein the RACH sequence time length is equal to one-half (½) of an OFDM symbol duration of the mmWave eNB.

7. A mmWave enhanced Node B (eNB) configured for time division duplexing (TDD), operable to achieve uplink synchronization with a user equipment (UE), the millimeter wave (mmWave) eNB having circuitry comprising:
   memory; and a processor coupled to the memory, configured to:
      establish downlink synchronization of time, frequency, and beam synchronization with the UE using a primary synchronization signal and a secondary synchronization signal to enable the UE to identify a transmission direction;
      perform receive beamforming in multiple beam directions to determine a directional reception of a random access channel (RACH) transmission communicated from the UE in the transmission direction for uplink synchronization of time, frequency, and beam direction with the UE; and
      receive, via radio resource control (RRC) messaging from the mmWave eNB, a schedule for communicating the RACH transmission a selected number of times, wherein a total duration of the RACH transmission is an integer multiple of an orthogonal frequency-division multiplexing (OFDM) symbol duration of the mmWave eNB.

8. The mmWave eNB of claim 7, wherein the circuitry is further configured to perform the receive beamforming in a plurality of sectors.

9. The mmWave eNB of claim 8, wherein the circuitry is further configured to use a codebook to select a different receive beam for each of the plurality of sectors.

10. The mmWave eNB of claim 7, wherein a total duration of the RACH transmission is equal to a RACH sequence time length plus a cyclic prefix time length.

11. The mmWave eNB of claim 10, wherein the RACH sequence time length is equal to or greater than a round-trip-time (RTT) of the RACH transmission plus a maximum delay spread of the of the RACH transmission.

12. The mmWave eNB of claim 10, wherein the cyclic prefix time length is greater than a round-trip-time (RTT) of the RACH transmission plus a maximum delay spread of the RACH transmission.

13. The mmWave eNB of claim 7, wherein the circuitry is further configured to select a RACH sub-carrier spacing of the RACH transmission equal to:
   a mmWave eNB sub-carrier spacing, wherein a RACH sequence time length is equal to one orthogonal frequency-division multiplexing (OFDM) symbol duration of the mmWave eNB;
   one half (½) the mmWave eNB sub-carrier spacing, wherein the RACH sequence time length is equal to two OFDM symbol durations of the mmWave eNB; or
   twice the mmWave eNB sub-carrier spacing, wherein the RACH sequence time length is equal to one-half (½) of an OFDM symbol duration of the mmWave eNB.

14. At least one non-transitory computer-readable storage medium, on a user equipment (UE) having at least one processor, comprising instructions for achieving uplink synchronization with a millimeter wave (mmWave) enhanced Node B (eNB) configured for time division duplexing (TDD), the instructions, when executed, cause the UE to:
   receive selected random access (RA) parameters from an anchor eNB for uplink synchronization on the mmWave eNB;
   identify a transmission direction for communication with the mmWave eNB based on a downlink synchronization of the UE with the mmWave eNB;
   communicate a random access channel (RACH) transmission in the identified transmission direction for uplink synchronization of time, frequency, and beam direction of the UE with the mmWave eNB; and
   receive a schedule, via radio resource control (RRC) messaging with an anchor eNB, of a plurality of times for communicating the RACH transmission, wherein a total duration of the RACH transmission is an integer multiple of an orthogonal frequency-division multiplexing (OFDM) symbol duration of the mmWave eNB.

15. The computer-readable storage medium of claim 14, comprising further instructions that, when executed, cause the UE to communicate the RACH transmission of the plurality of times to enable the mmWave eNB to perform receive beamforming in multiple beam directions to provide a directional reception of the RACH transmission.

16. The computer-readable storage medium of claim 15, comprising further instructions that, when executed, cause the UE to communicate the RACH transmission a plurality of times to enable the mmWave eNB to perform receive beamforming in multiple beam directions in a plurality of sectors to provide directional reception of the RACH transmission, wherein the plurality of sectors are configured using radio resource control (RRC) messaging, and a codebook is used select a different receive beam for each of the plurality of sectors for performing the receiving beamforming.

17. The computer-readable storage medium of claim 14, wherein a total duration of the RACH transmission is equal to a RACH sequence time length plus a cyclic prefix time length.

18. The computer-readable storage medium of claim 17, wherein the RACH sequence time length is equal to or greater than a round-trip-time (RTT) of the RACH transmission plus a maximum delay spread of the of the RACH transmission.

19. The computer-readable storage medium of claim 17, wherein the cyclic prefix time length is greater than a round-trip-time (RTT) added to a maximum delay spread.

20. The computer-readable storage medium of claim 14, comprising further instructions that, when executed, cause the UE to select a RACH sub-carrier spacing of the RACH transmission equal to:
   a mmWave eNB sub-carrier spacing, wherein a RACH sequence time length is equal to one orthogonal frequency-division multiplexing (OFDM) symbol duration of the mmWave eNB;
   one half (½) the mmWave eNB sub-carrier spacing, wherein the RACH sequence time length is equal to two OFDM symbol durations of the mmWave eNB; or
   twice the mmWave eNB sub-carrier spacing, wherein the RACH sequence time length is equal to one-half (½) of an OFDM symbol duration of the mmWave eNB.

* * * * *